United States Patent [19]

Yokoyama et al.

[11] Patent Number: 5,735,933
[45] Date of Patent: Apr. 7, 1998

[54] METHOD FOR PROCESSING METALLIC WASTE

[75] Inventors: Yoshiaki Yokoyama, Konosu; Teruhisa Ogihara, Ota, both of Japan

[73] Assignee: Teruhisa Ogihara, Gunma, Japan

[21] Appl. No.: 506,318

[22] Filed: Jul. 24, 1995

[30] Foreign Application Priority Data

| Jul. 29, 1994 | [JP] | Japan | 6-196269 |
| Sep. 9, 1994 | [JP] | Japan | 6-240791 |
| Nov. 2, 1994 | [JP] | Japan | 6-292028 |
| Nov. 2, 1994 | [JP] | Japan | 6-292029 |

[51] Int. Cl.$^6$ ............................ C22B 7/00
[52] U.S. Cl. .................... 75/403; 75/624; 75/638; 75/665; 75/669; 75/670; 75/690; 75/694; 429/49
[58] Field of Search .............. 75/414, 403, 10.29, 75/638, 690, 624, 665, 669, 670, 694; 429/49

[56] References Cited

U.S. PATENT DOCUMENTS

| 4,091,825 | 5/1978 | Baker . | |
| 4,227,922 | 10/1980 | Laws et al. . | |
| 4,401,463 | 8/1983 | Melin et al. | 75/669 |
| 5,205,857 | 4/1993 | Yokoyama . | |
| 5,350,438 | 9/1994 | Jidosha et al. . | |
| 5,437,705 | 8/1995 | DeLisle et al. | 75/403 |

FOREIGN PATENT DOCUMENTS

| A-075978 | 10/1980 | European Pat. Off. . | |
| A-493122 | 7/1992 | European Pat. Off. . | |
| 0209307 | 4/1993 | European Pat. Off. . | |
| A-608098 | 7/1994 | European Pat. Off. . | |
| A-624656 | 11/1994 | European Pat. Off. . | |
| 2024302 | 8/1971 | Germany | 75/647 |
| 4-346681 | 12/1992 | Japan . | |

OTHER PUBLICATIONS

Patent Abstracts of Japan vol. 17, No. 492 (C–1107) JP–A–05 125457 (Ogihara) 21 May 1993.

*Primary Examiner*—Melvyn Andrews
*Attorney, Agent, or Firm*—Abelman, Frayne & Schwab

[57] ABSTRACT

A processing method by which metals may be recovered at a high purity from metal-containing waste materials.

The method for processing metal-containing waste materials comprises crushing a metal-containing waste material to a particle size of 1–50 mesh, separating and recovering the metal-containing particles from the crushed portion, introducing the metal-containing particles into a vacuum heating furnace, pre-heating the furnace while under suction evacuation, and then raising the temperature of the furnace in stages while continuing the vacuum suctioning, recovering the metal and non-metal vapor produced at each temperature level using a condensing and adsorbing means, and recovering the liquated metals as melts. The method may be used to process waste batteries, copper-containing waste materials and the like in the same manner to recover high-purity metals.

21 Claims, 2 Drawing Sheets

METHOD FOR PROCESSING METALLIC WASTE

BACKGROUND OF THE INVENTION

1. Field of the Invention

The present invention relates to a method for processing metallic waste which is suitable for recovering metal components from various types of waste materials ranging from empty cans to household electrical appliances, automobiles, dust from electric dust collectors, furnace slag, sludge, and the like. More specifically, the present invention relates to a method for vacuum-heating processing of waste materials containing useful metals, such as cans, batteries, household electrical appliances, automobiles, bicycles and the like, in order to recover metal components and various other types of compounds (halides, oxides, etc.).

The present invention further relates, in particular, to a method for processing waste batteries, which may be applied for innocuous processing of all kinds of used batteries and for processing of other metallic scrap materials. In particular, the present invention relates to a method for processing waste batteries by which various kinds of waste batteries may be thermally treated without advance destructive processing, and the metallic and non-metallic valuable substances recovered and converted into disposable non-harmful residues.

The present invention further relates to a processing method by which, via a simple treatment process, high-purity and highly valuable copper may be recovered from waste materials such as printed wiring boards and discarded motors and wiring materials used in various electrical and electronic devices, from which component separation is normally difficult due to their complex structures which include chemically stable, organic high molecular weight substances.

2. Description of the Related Art

Because of the dramatic increase in the volume of waste materials of used or old machines from the industries of household products, electrical and electronic devices, automobiles, etc. where new machines are constantly introduced into the market along with the rapid rate of technological progress, and of waste materials such as empty cans, etc. which are used distribution containers from the food and drink industry, the limits of the final processing sites for such wastes are being reached, and the recycling of such waste is not only a problem for waste processing sites, but is also becoming an issue from the point of view of the earths resources.

Highly valuable metals such as gold, platinum and other rare metals have been recovered conventionally, but since in the case of less expensive metals there is unavoidable price competition with cheaply supplied virgin materials, the recovery of relatively expensive reclaimed materials from industrial wastes is governed by the price trends of those reclaimed materials, and with the present difficulties involved in regular recovery processes it is desirable to establish a technique for a highly efficient, low-cost recovery process.

For example, for recycling processing of empty cans, at present recovered empty cans are usually pressed flat with a flattener prior to automatic separation of the aluminum cans and steel cans, and while aluminum cans are sent directly to an electric furnace producer, steel cans are fed to a processing step for separation of the aluminum in the can lid sections, after which the pressed steel cans are destroyed with a shredder, the can paint is burned off in a rotary kiln, and then the aluminum sections are melted off (recovered) with the remaining steel sections being formed into pellets and delivered to blast furnace producers, etc.

However, because the paint burning treatment step in the rotary kiln in this recovery method is in a so-called oxidation furnace at about 700° C., oxidation of the iron and aluminum is promoted, inevitably lowering the recovery rate of the iron and aluminum metal carriers, while the product value is necessarily lowered due to a residue of tin derived from the can plating, etc., and in some cases other metal components, in the recovered iron.

Furthermore, in the case of waste batteries, mercury cells are the only ones where actual recovery of a valuable substance is accompanied with innocuous processing, and in the processing method therefor, mercury cells are separated and recovered from various types of used waste batteries and mechanically destroyed, and then heated to recover the mercury and convert the cells into residues of only harmless metals and inorganic substances. However, this processing method has not become a commercial method because of the great expenses involved in the sorting of mercury cells from the many other waste batteries and in the mechanical destruction at the preparatory processing stage.

Moreover, as a method of recovering copper components from printed wiring boards retrieved in large amounts from discarded personal computers, the boards are finely pulverized and treated with hydrochloric acid or sulfuric acid to convert the copper to chlorides or sulfides which are separated from the plastic and recovered; however, this has not become widespread as a commercial method because it is an indirect method with complicated procedures, while effluent treatment equipment, etc. is also required.

Likewise, methods of recovering metal components from various industrial wastes, including discarded household electrical appliances, basically depend on combustion removal of organic components and melt extraction based on differences in melting points of the metal components, and consequently there is inevitable loss of the metal components in the form of oxides, while it is difficult to obtain only specific metal components at a high purity, and it is also impossible to recover the various compounds such as oxides and halides, each separately.

It is an object of the present invention to provide a method for processing waste materials by which various types of useful metal components may be recovered at a high purity and at a high yield from different types of waste materials containing large amounts of such metal components, by way of a simple treatment process. It is a further object to simultaneously separate and recover compounds such as metal oxides and halides.

It is still a further object of the present invention to provide a method for processing used batteries which may be applied not only to mercury cells which have conventionally been processed for recovery, but also to other primary battery types which are discarded without such processing, as well as to other metallic scrap materials, which method is capable of inexpensively recovering useful metals and non-metals from these batteries, etc. and converting them into innocuous, disposable inorganic residues.

It is a particular object of the present invention to provide a commercial, highly valuable method for processing waste batteries by which it is possible to thermally process recovered waste batteries which are a mixture of various battery types, without their separation and without the need for their destruction, to recover useful metals and non-metals and convert them into disposable, harmless inorganic residues.

It is yet another object of the present invention to provide a vacuum-heating processing method which may be applied to all kinds of waste materials containing a variety of metals, chiefly copper, to allow recovery of highly pure individual metal components at a high yield.

SUMMARY OF THE INVENTION

The present invention, which is aimed at achieving the above-mentioned objects, relates to a processing method by which, basically, various metal-containing waste materials are heated in a sealed heating furnace under vacuum, wherein the furnace temperature is raised in stages, and metal components, metal compounds, and the like which volatilize at each temperature level due to the vapor pressure are collected by vacuum suction, while the components which melt at each temperature level are separated and collected.

The present invention further relates to a method for processing metal-containing waste materials which is characterized by crushing a metal-containing waste material to a particle size of 1 to 50 mesh, recovering the metal-containing particles from the crushed material by weight separation, magnetic separation or the like, introducing the metal-containing particles into a vacuum heating furnace, preheating the furnace while evacuating the air, and then raising the temperature of the furnace in stages, collecting and recovering by vacuum suction the vapor and gas of the metals, metal compounds and non-metal compounds produced at each temperature level using a condenser and adsorber, and finally extracting the liquated metal components as melts.

The present invention still further relates to the above-mentioned method for processing metal-containing waste materials which is characterized by removing from the waste material particles crushed to a size in the range of 1 to 50 mesh Tyler, a desired category of particles with a particle size range of ±50% thereof, and subjecting this to the above-mentioned vacuum-heating processing.

The present invention still further relates to a method for processing metal-containing waste materials which is characterized in that the above-mentioned vacuum-heating processing is performed using a vacuum-heating processing apparatus which comprises a pre-heating chamber equipped with a vacuum pump, a plurality of vacuum heating furnaces hermetically and serially connected to the pre-heating chamber, each of which are provided with a metal vapor condenser and a non-metal vapor adsorber (for liquid and gas) and a vacuum pump for vacuum suction of vapor generated in the furnace through the condenser and adsorber, as well as a melt-extracting mechanism, and to the last of the vacuum heating furnaces there is connected a cooling chamber equipped with a cooling non-oxidizing gas-feeding mechanism.

DESCRIPTION OF THE PREFERRED EMBODIMENTS

The metal waste materials which may be processed according to the present invention are not particularly restricted. Metal-containing waste materials from distribution containers such as used empty cans, parts from electrical devices such as printed wiring boards, discarded automobile parts, waste batteries, amusement machines such as pachinko machines, etc. as well as furnace slag and dust from electric dust collectors, and any copper-containing materials, may be processed.

These waste materials may be processed in the form in which they are recovered. However, they are preferably loaded into the furnace after separation, removing as much as possible the non-metal components, that is wood and plastics, by a desired method, for example weight separation or magnetic separation, which are normally applied for the removal of non-metal materials. By performing this form of sorting with crushing, it is possible to increase the amount of waste material to be loaded into the furnace for processing, and thus shorten the heating time in the furnace.

In addition, for the crushing and sorting of the waste material to be processed, the final size of the particles of the waste material to be processed when fed to to the furnace is preferably 1 mesh or smaller. Limiting the particles to 1 mesh or smaller eliminates formation of crevices, or cavities, in the particle surface, and therefore the components collected as melts during the thermal processing in the furnace do not remain in the waste material to be processed; this is advantageous not only because it contributes to a shorter processing time because they have a more rapid flow and are completely recovered, but also because there is no contamination of the metal components recovered at the subsequent temperature levels and thus no lowering of purity of those metal components. From the point of view given above, the material to be processed is usually crushed to particles of from about 1 mesh to 50 mesh. A size of greater than 1 mesh is not preferred since there will be particles with crevices which can cause them to remain in the melt, while even with crushing to less than 50 mesh no improvement in efficiency may be expected, and it is thus not cost-effective.

Furthermore, after the metal-containing waste materials have been crushed to between 1 and 50 mesh, they are preferably further sifted for separation into categories of particle mixtures with sizes in prescribed ranges, and most preferably they are separated into categories consisting of main particles and a mixture of particles with a particle size of within ±50% thereof. By separating the particles into categories of particle sizes in the above ranges, uniform treatment of each of the particles is possible without processing irregularities during the thermal processing, while the grain sizes of products comprising high vapor pressure components (non-melting components) such as iron, which remain at the end, are also more uniform for additional improvement in the value of the product.

In addition, weight separation and magnetic separation are also preferred for advance separation of the object metal-containing particles which are to be loaded into the furnace from particles which do not contain those metals, in order to achieve higher purity.

The present invention further relates to waste batteries and to a method for processing waste batteries, which comprises heating waste batteries in a sealed heating furnace under a vacuum in which the furnace temperature is raised in stages, to vaporize and destroy the coating structure consisting of metals and non-metals composing the sealed structure of the battery, while separating and collecting the vapor and gas of the metals and non-metals produced in the furnace by vacuum suction in stages at each temperature level.

More specifically, the present invention relates to a method for processing waste batteries which comprises introducing waste batteries into a simple sealed thermal processing furnace constructed mainly from a vacuum pump for drawing out metal vapor, non-metal gas, etc. from the furnace by heating means, evacuation means, non-oxidizing gas-feeding means, high-temperature non-oxidizing gas-storing means, produced metal vapor-condensing/collecting means, non-metal component-adsorbing/collecting means or both of the above-mentioned collecting means, pre-heating the heating furnace after its evacuation by feeding a high-temperature non-oxidizing gas if necessary, and then after evacuation of the furnace again, using the heating means to raise the temperature of the waste batteries in the furnace by stages, separating and collecting the metal vapor and non-metal gas produced at each of the temperature levels with a condenser and gas adsorber, and finally feeding a non-oxidizing gas into the furnace to cool the processed waste batteries, if necessary also using the non-oxidizing gas which is taken out at a high temperature as the pre-heating gas.

The present invention still further relates to a method for processing waste batteries which comprises transporting in order waste batteries to be processed in a plurality of hermetically connected processing chambers which include a pre-heating chamber connected to a vacuum pump and if necessary also connected to a high-temperature non-oxidizing gas storage tank, and a plurality of hermetically connected thermal vaporization chambers which are serially connected to the pre-heating chamber and each connected to vacuum pumps via a condenser and gas adsorber in that order, wherein the furnace temperature is set to a high temperature in stages in order from the thermal vaporization chamber directly connected to the pre-heating chamber, and to the last of the group of thermal vaporization chambers there is connected a cooling chamber to which is connected a cooling non-oxidizing gas-feeding apparatus and if necessary also a high-temperature non-oxidizing gas storage tank. The basic steps of the process include the series of steps of introducing waste batteries into the pre-heating chamber and subjecting the inside of the chamber to suction evacuation to create a vacuum, and then transporting them to the evacuated thermal vaporization chambers which are hermetically connected to the pre-heating chamber for thermal processing at prescribed temperatures; suctioning the metal vapor and non-metal gas produced at each temperature with a vacuum pump and collecting them with a condenser and adsorber, and then sending the batteries to another vaporizing chamber thereafter for thermal processing in the same manner at an even higher temperature; and after collecting the metal and non-metal components in each vaporizing chamber, sending them to a cooling chamber to cool the residue of the processed waste batteries with a non-oxidizing gas and discharging the residue from the furnace, if necessary storing the high-temperature non-oxidizing gas in a storage tank outside the furnace for use in pre-heating new waste batteries.

In the above-mentioned method of using a plurality of vaporizing chambers, a reducing gas-feeding apparatus may be connected to the last thermal vaporization chamber of the plurality of thermal vaporization chambers, and upon completion of thermal processing at the final vaporizing chamber the reducing gas may be fed to that vaporizing chamber to reduce the processed waste batteries.

When such reducing treatment is employed, the metal compounds in the waste battery residue are reduced to become more easily recoverable, and they may be combined with the next group of waste batteries fed to the pre-heating chamber for re-processing.

In a more basic sense the present invention relates to a method for processing waste materials which comprises heating copper-containing waste materials in a sealed heating furnace under vacuum and raising the temperature thereof in stages to break down the structure of metals and organic substances making up the waste materials, while also vacuum suctioning the low-vapor-pressure metals and non-metals as vapors and gases in stages at each temperature level for their separation and collection, and heating the furnace at the final stage to a temperature above the melting point of copper to obtain molten copper for its collection, and then cooling it to solidify it for recovery.

More specifically, the present invention relates to a method for processing copper-containing waste materials which is characterized by loading copper-containing waste material into a two-level jig (which as used herein shall be understood to be a heat resistant movable carrier or support means hat is unaffected by the high temperature process) comprising a melt catch pan section and a waste material holder section and introducing it into a sealed heating furnace, pre-heating the material while subjecting the inside of the furnace to suction evacuation, and further heating while continuing the vacuum suction to raise the temperature of the waste material in stages, recovering the vapor produced at each temperature level by condensation and adsorption means, raising the temperature at the final stage to above the melting point of copper and extracting the molten copper as liquid drops in the catch pan section, and, after cooling them to solidify them together with the liquid drops of molten copper remaining in the caked carbon formed in the holder section by carbonization of the plastic, removing the carbon components adhering thereto.

The present invention further relates to the aforementioned method for processing copper-containing waste materials which is characterized in that the thermal processing of the copper-containing waste materials to obtain copper grains by extracting the above-mentioned molten copper as liquid drops in the catch pan section and cooling them to solidify them together with the liquid drops of molten copper remaining in the caked carbon formed in the holder section, is performed using a simple sealed thermal processing furnace provided with a vacuum pump for drawing out metal vapor and non-metal gas from the furnace by heating means, non-oxidizing gas-feeding means, high-temperature non-oxidizing gas-storing means, produced metal vapor-condensing means and non-metal component-adsorbing means.

The present invention further relates to a method for processing copper-containing waste materials which is characterized in that the thermal processing of the copper-containing waste materials to obtain copper grains by extracting the above-mentioned molten copper as liquid drops in the catch pan section and cooling them to solidify them together with the liquid drops of molten copper remaining in the caked carbon formed in the holder section, is performed by passing the copper-containing waste material in the above-mentioned two-level jig in order through a series of thermal processing apparatuses comprising a pre-heating chamber connected to a vacuum pump and a high-temperature non-oxidizing gas storage tank, and a plurality of connected thermal vaporization chambers which are hermetically and serially connected to the pre-heating chamber and each connected to vacuum pumps via a condenser and gas adsorber in that order, with the furnace temperature set to a high temperature in stages in order from the thermal vaporization chamber directly connected to the pre-heating chamber, wherein the last thermal vaporization chamber thereof is a thermal vaporization chamber set to a temperature above the melting temperature of the copper component, and to this last thermal vaporization chamber there is hermetically connected a cooling chamber to which are connected a cooling non-oxidizing gas-feeding apparatus and a high-temperature non-oxidizing gas storage tank.

The present invention further relates to the above-mentioned method for processing copper-containing waste material which is characterized by employing a step of mechanically crushing the hardened copper grains, removing the adhering carbon, and then polishing the surface of the copper particles, and particularly a step of using alumina powder as the polishing material for the polishing, in order to remove the adhering carbon components from the carbon grains which have been cooled to solidity.

The present invention further relates to a method for processing copper-containing waste materials which is characterized in that the processing by the above-mentioned vacuum-heating processing is performed after crushing the copper-containing waste material with a crusher to a size of 1 mesh or less.

The present invention further relates to a method for processing copper-containing waste materials which is characterized in that after the waste material is crushed with a crusher to particles in the range of 1 mesh to about 50 mesh, they are separated with sieves into categories of copper-containing waste material particles consisting of main particles and particles with a particle size difference of within ±50% of the main particles, and the processing is performed by the above-mentioned vacuum-heating processing for each of these categories.

According to the above-mentioned processing method of the present invention, the jig for carrying the waste material to the furnace must be a two-level type. As mentioned previously, it is a characteristic and essential element of the present invention that the copper contained in the waste material be melted and collected, and therefore the molten copper catch pan must be separate and situated below the waste material holder section.

According to the present invention, the recovery of the copper components in the waste material must be carried out by heating at a temperature above the melting point of copper, at the final stage of the steps of thermal processing of the waste material.

The waste material is heated in stages, and at the final stage there remain the high-vapor-temperature copper component and the carbon resulting from decomposition of the plastic; however, when this mixture is heated to about 1086° C., the melting point of copper, the copper turns into liquid drops of molten copper, and a portion thereof drops into the catch pan as globular molten copper with carbon adhering to the surface thereof. A portion thereof is also incorporated as liquid drops into the caked carbon formed in the holder section. Since the carbon only adheres to the surface of the globular molten copper and is not incorporated in the interior thereof, the carbon may be removed from the surface by mechanical or physical processing after cooling to solidity, and as a result the copper may be recovered as highly pure copper grains containing no carbon.

According to the processing method of the present invention, the copper-containing waste material may be processed directly as recovered from waste materials such as electronic devices and the like.

However, the processing is preferably performed after crushing of the copper-containing waste material, since this allows a greater amount of processing per batch and also allows rapid completion of melting of the copper component, and it is also preferred because it eliminates trouble which occurs by contact with the furnace wall while the material is transported inside the furnace in cases where large amounts of material are carried in the furnace. In addition, when the processing is performed after crushing the copper-containing waste material, it is preferably crushed to particles of 1 mesh or smaller.

Furthermore, after crushing to particles in the range of 1 mesh to about 50 mesh, the waste material particles are preferably extracted in categories of mixtures consisting of main particles and particles with a particle size difference of within ±50% of the main particles, and the processing is performed for each of these categories.

When the copper-containing waste material is processed after crushing to a range of from 1 to 50 mesh, a lower degree of variation in the particles, that is a narrower particle distribution range, gives uniformity of the particle size of the copper particles obtained by the final step of the vacuum-heating processing of the present invention, with easier separation from the carbon and a higher purity as copper particles. In the case of low amounts of copper components such as in copper-plated goods, the copper may be sufficiently recovered by vacuum vaporization.

When the temperature level of the vacuum-heating processing of the waste material is about 1000° C.–1050° C., the metal components other than copper usually vaporize and are recovered even without heating to the melting point of copper, and the remainder thus consists almost entirely of the copper component and organic carbonized carbon component; it is thus possible to achieve the object of limiting the recovery to the copper component alone. Such processing is effective when the waste material is tin (Sn)-plated copper wire, and for example, the Sn component may be vaporized and collected by heating at 1050° C. to leave pure copper. However, in cases where the waste material contains large amounts of plastic and other metal components, the copper obtained at this stage exists in a complex mixture with carbon, with some of the carbon being incorporated inside the copper, and therefore the copper recovered will be of low purity containing carbon substances which cannot be removed by crushing and polishing in later steps carried out to remove the carbon from the solidified copper.

According to the present invention, it is important that the thermal processing of the waste material be carried out in stages. Because the waste materials to be processed are not restricted to those containing copper as the sole metal component and normally contain a number of metal and non-metal components together, the thermal processing must be divided into a plurality of temperature levels, with the vaporized components at each temperature level being recovered by vacuum suctioning and condensation or adsorption, for separate recovery of each of the components at each vaporization temperature level.

The construction of the present invention which allows recovery of a number of metal components by dividing the thermal processing of waste materials into a plurality of temperature levels is an important essential element also from the point of view that one of the objects of the present invention is to provide a processing method which allows different waste materials to be indiscriminately treated in admixture without separating each of the metal components contained therein.

The processing for removal of the adhering carbon from the globular solidified copper obtained from the thermal processing steps may be performed by mechanical crushing and subsequent polishing.

The mechanical crushing is processing for removal of most of the carbon by destruction of the carbon film deposited on the surface, and it may be performed, for example, using a crusher equipped with a stirring blade. This crushing also crushes the caked carbon formed in the holder section, while the granular solidified copper incorporated therein is also recovered.

The beady copper grains from whose surface most of the adhering carbon has been removed by mechanical crushing still contains a slight amount of carbon incorporated into the surface sections of the copper, and thus in order to remove that carbon, the surface of the carbon grains is further subjected to polishing treatment. The polishing treatment is not particularly restricted so long as it is a method for abrading the surface of the copper grains to a degree which removes the carbon incorporated into the surface of the copper grains, and an example thereof is polishing with $SiO_2$ particles; however, wet polishing with alumina powder as the polishing material is most suitable in order to efficiently remove only the layer containing the carbon present in the limited surface sections.

As mentioned above, the carbon-containing waste material is crushed into particles in the range of 1 to 50 mesh, and particularly, when the processing is performed with crushed particles which are further sifted and separated into categories consisting of main particles and a mixture of particles differing in particle size to within ±50% of the size of those particles, weight separation or magnetic separation, etc. may be efficiently performed prior to loading the crushed particles in the processing furnace, in order to remove the particles containing no copper; furthermore, since it has been confirmed that separation of the carbon from the copper particles by mechanical crushing of the carbon-adhered copper particles obtained at the final step is satisfactory, pure copper particles may be obtained without the polishing step as mentioned above, by simple carbon removal by crushing treatment.

Examples of the method for processing waste material according to the present invention are given below, but the present invention is in no way limited to the methods in these examples.

EXAMPLE 1

Figure 1:
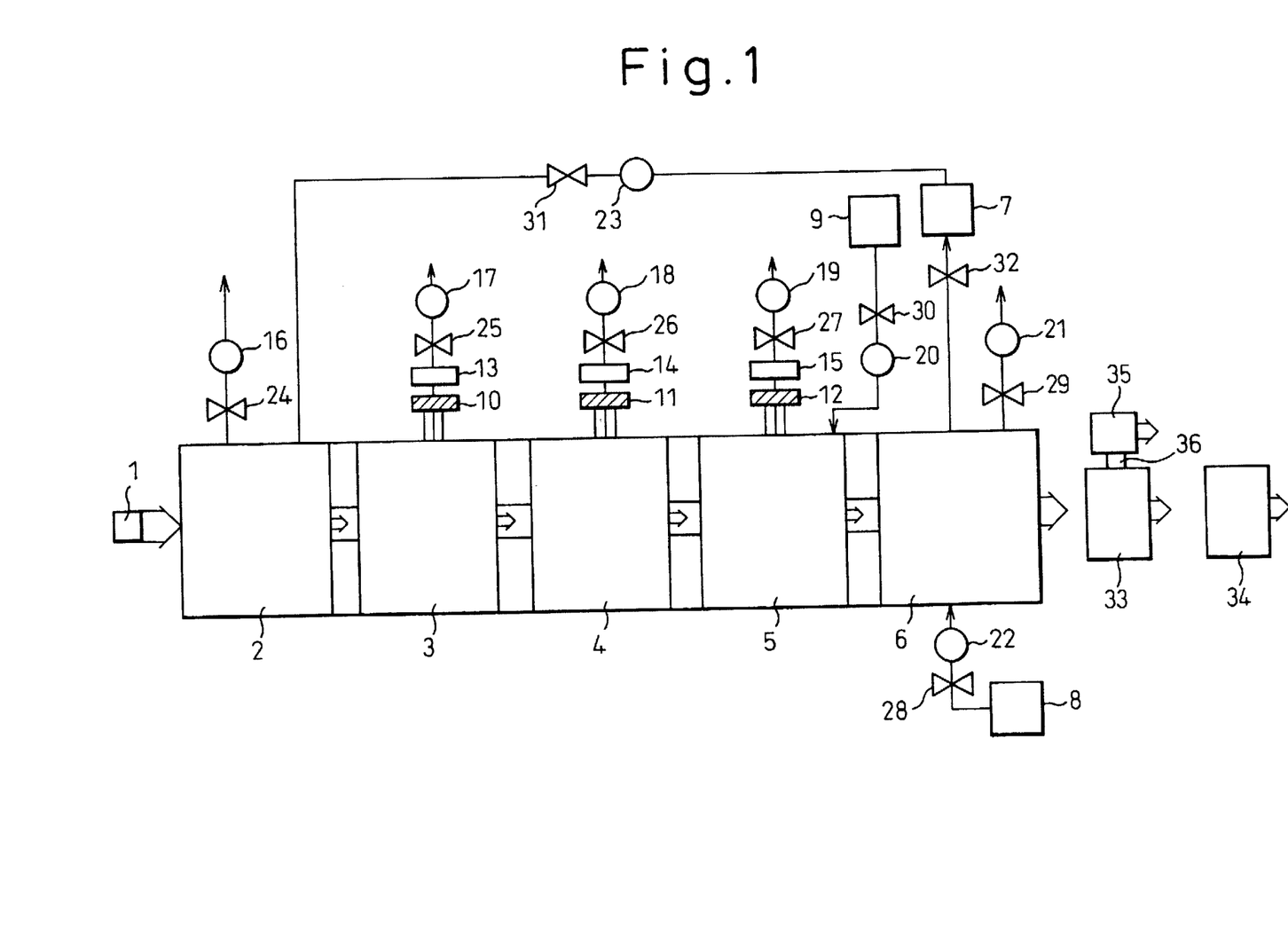
FIG. 1 is a schematic view of a vacuum-heating processing apparatus with a plurality of processing chambers to be used for the method of the present invention.

FIG. 1 is a schematic view of an embodiment of a thermal processing apparatus capable of performing the method for processing waste material according to the present invention.

In this figure, the numeral 1 indicates a waste material loading jig which may be moved between the heating furnaces by any desired moving means. The numeral 2 indicates a pre-heating chamber/evacuation chamber (air exchange chamber), 3–5 indicate vacuum-heating processing chambers, and 6 a cooling chamber (also a gas exchange chamber). The numeral 7 is a high-temperature non-oxidizing gas storage tank, 8 is a cooling non-oxidizing gas-feeding source, 9 is a reducing gas-feeding source, 10–12 are metal vapor condensers, 13–15 are non-metal component adsorbers, 16–19 and 21 are vacuum pumps, 20, 22 and 23 are air pumps, and 24–32 are valve. In cases where the cooling gas and reducing gas sources are pressurized gases, 20 and 22 are not necessarily required.

Different types of cans, including steel and aluminum beer cans, juice cans, confectionery cans and the like, are all pressed flat with a flattener, sent to a crusher to be crushed to 1 mesh or less, to include about a one inch mesh, and upon sifting the particles in the category of 5–15 mesh are taken out and processed as the waste material 1.

The waste material 1 is processed using a plurality of hermetically connected processing chambers consisting of a pre-heating chamber 2 which is connected with a pipe to the high-temperature non-oxidizing gas storage tank 7, a plurality of hermetically connected vacuum-heating vaporization chambers 3–5 which are also hermetically connected in a serial manner to the pre-heating chamber, and connected with pipes to vacuum pumps 17–19 via condensers 10–12, gas adsorbers 13–15 and bulbs 25–27, and a cooling chamber 6 connected to the vacuum-heating vaporization chamber 5 and is also independently connected with pipes to a cooling non-oxidizing gas-feeding source 8 and a high-temperature non-oxidizing gas-storage tank 7.

The waste material 1 is loaded into the holder section of the waste material jig, which is set onto a pressure pusher or motorized roller to be carried into the apparatus comprising the series of processing chambers beginning with the pre-heating chamber 2 (or evacuation chamber), and transported to each processing chamber in order and ejected outside the processing apparatus through the final cooling chamber 6.

The jig holding the waste material is then carried into the pre-heating chamber 2, the entrance port is shut to seal the pre-heating chamber, and the vacuum pump 16 is activated to lower the pressure of and evacuate the pre-heating chamber 2 while it is heating, which creates a non-oxidizing condition around the waste material while it is pre-heated to a temperature of, for example, about 50° C.–100° C. The pre-heating chamber must be used for this heating in cases where the waste material contains large amounts of moisture or oil, but when processing normal dry matter it may be used as an evacuation chamber to simply eject the air inside it.

In cases where the amount of waste material being introduced is large, making it difficult to uniformly preheat the entirety within a short time, the non-oxidizing gas for pre-heating is pressure-fed by a pump from the storage tank 7, the inside of the pre-heating chamber is pre-heated while under pressure from the non-oxidizing gas with agitation by an agitating fan, and upon completion of the pre-heating process the vacuum pump 16 is activated to eject the non-oxidizing gas from the pre-heating chamber to create a vacuum in the furnace. Most of the moisture is ejected at this stage.

Next, the jig leaves through the exit port of the pre-heating chamber and enters into the first vacuum-heating processing chamber 3 which is hermetically connected to the pre-heating chamber and is already at a high temperature and vacuum state (350° C., $5 \times 10^{-2} – 5 \times 10^{-3}$ Torr), the entrance port of the first vacuum-heating processing chamber is shut and heating is continued, and the vapor and gas produced in the first vacuum-heating processing chamber is suctioned out by the vacuum pump 17 through the condenser 10, gas adsorber 13 and bulb 25. Normally, the pipe running from the first vacuum-heating processing chamber to the condenser is heated by the heater, as are the pipes running from the vacuum-heating processing chambers to the condensers thereafter.

In this example, the condenser 10 provided at the first vacuum-heating processing chamber 3 becomes a passageway for gases which have been released and consist mainly of organic cracked gases, which are collected in the adsorber 13 thereafter. The collected gases primarily contain organic components, $CO_2$, etc. produced by the decomposition of paints.

Upon completion of the vapor generation in the first vacuum-heating processing chamber, the jig is sent to the second vacuum-heating processing chamber 4 which is hermetically connected to the first thermal processing chamber and is already at a high temperature and vacuum state (660° C.–750° C., 5×10$^{-3}$ Torr). The second vacuum-heating processing chamber is sealed shut and the waste material is heated to raise the temperature to a prescribed temperature, during which time the valve 26 is opened and the vapor and gas produced in the second vacuum-heating processing chamber are collected in succession at the condenser 11 and the gas adsorber 14 by the action of the vacuum pump 18.

If lead chloride or zinc chloride is present in the waste material, it will be collected in the condenser 11 as vapor at this stage, but since in this example the waste material is virtually free of such components, there is almost no collection of components at the condenser. A minor amount of plastic decomposition products is collected at the adsorber 14. Also, aluminum is melted and collected in a melt catch pan preset at the bottom of this second vacuum-heating processing chamber.

Upon completion of vapor generation at the second vacuum-heating processing chamber, the jig is sent to the third vacuum-heating processing chamber 5 which is hermetically connected to the second thermal processing chamber and is already at a high temperature and vacuum state (750° C.–900° C., 5×10$^{-2}$–5×10$^{-3}$ Torr). The third vacuum-heating processing chamber is sealed shut and the valve 27 is opened, and until the waste material reaches a prescribed temperature by heating, the vapor and gas produced in the third vacuum-heating processing chamber are adsorbed and collected at the condenser 12 and the gas adsorber 15 by the action of the vacuum pump 19. Various metal compounds are recovered in the condenser 12 at this stage, but in this example their amount is small, although lead, etc. may be collected.

The collection of vaporized components in this third vacuum-heating processing chamber may, if necessary, be performed by additional vacuum heating after heating and reduction treatment with a reducing gas such as hydrogen, which is fed from the reducing gas source 9. As mentioned previously, when reduction treatment is employed, metal compounds such as oxides are reduced to simple metals and collected as vapor. However, as there is no particular need therefor in this example, such a case is omitted. The thermal processing in this third vacuum-heating processing chamber is the final thermal processing, and the temperature is set to 1000° C. or slightly higher, which is above the boiling point of components other than iron, the main final object metal component to be recovered. At this temperature, a small amount of copper, if present, becomes melted and is recovered in drops in the catch pan as a beady substance the surface sections of which are coated with carbon. However, since virtually no copper is present in the waste material in this example, it is not recovered.

Upon completion of removal and recovery of the metal components other than iron in the waste material at the third vacuum-heating processing chamber 5, the residue consists of iron coated with carbon from the decomposition and carbonization of organic substances such as plastic. After being processed at this third vacuum-heating processing chamber, the non-vaporized, non-melted residual iron component (particles), though having undergone no special reduction treatment, has a beautiful metallic luster surface, with no coating of oxides or other compounds. This is because the surface coating oxides, etc. are reduced by the presence of carbon and the processing under high vacuum at this stage. This indicates that the processing method of the present invention under this high vacuum may also be used for the recovery of metal components from metal oxides in dust and slag. The jig carrying the residual component then leaves this processing chamber 5 to the cooling chamber 6, where it is cooled with nitrogen gas fed from the storage tank 8, and the heated nitrogen gas is fed to the storage tank 7 and fed to the pre-heating chamber for reuse to pre-heat the next waste material particles to be processed.

The cooled residue exists as iron particles, containing virtually no other metal components, together with a slight amount of carbon. Since a slight amount of carbon adheres to the cooled residue, the carbon may be removed by any desired polishing method, or in some cases the residue may be used in that state as a foundry material or as a material for electrical furnace charging.

When the method is applied for the processing of less waste material of fewer types, the number of thermal processing furnaces may be reduced.

EXAMPLE 2

An example of a method of processing waste batteries will now be explained.

Figure 2:
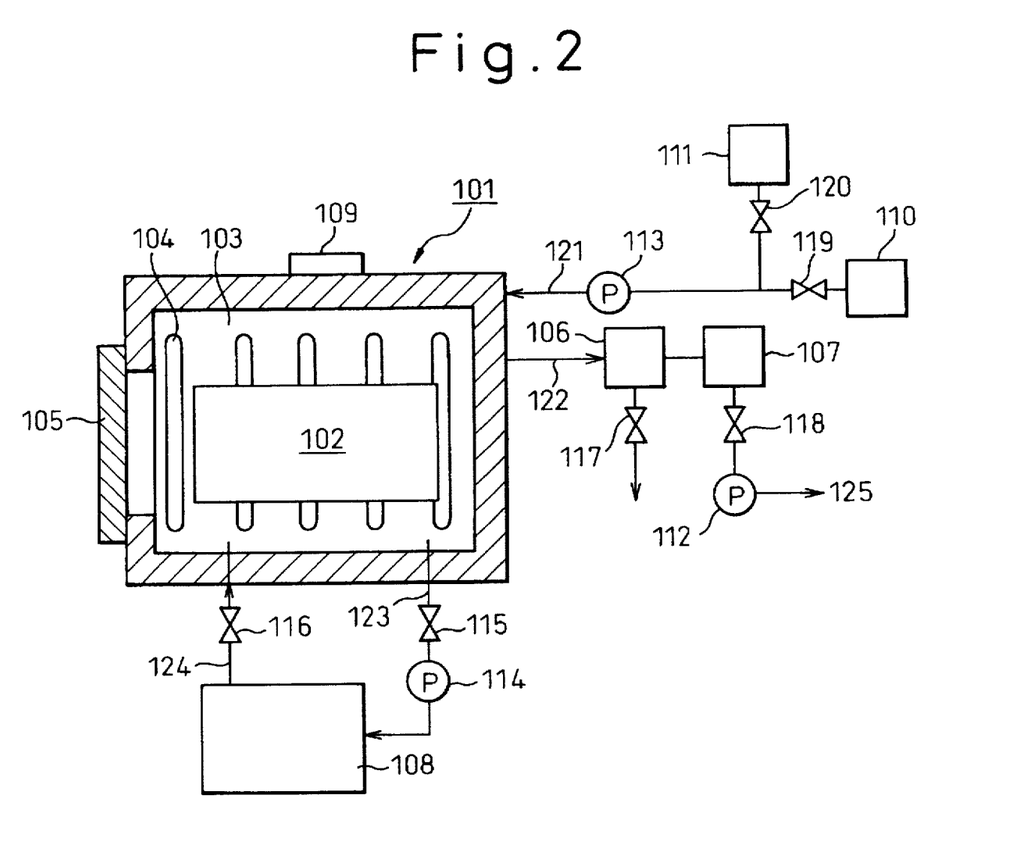
FIG. 2 is a schematic view of a simple vacuum-heating processing furnace to be used for the method of the present invention.

FIG. 2 is a schematic view of an embodiment of a simple thermal processing apparatus capable of performing the method for processing waste batteries according to the present invention.

In the figure, the numeral 101 indicates a thermal processing furnace comprising a sealed container, 102 is a tray and jig which hold waste batteries to be processed, 103 is a space for processing the waste batteries to be processed, 104 is a heating means placed in the space 103, 105 is a port (direct air port), 106 is a condenser, 107 is a gas adsorber, 108 is a non-oxidizing gas storage tank for pre-heating, 109 is a furnace gas-agitating fan, 110 is a non-oxidizing gas storage tank, 111 is a reducing gas-feeding source, 112 is a vacuum pump, 113 and 114 are air pumps, 115, 116, 117, 118, 119 and 120 are bulbs, 121, 123 and 124 are pipes, 122 is a heated pipe, and 125 is a gas ejection passage.

A group of waste batteries 102 consisting of various types of used batteries is loaded onto a waste battery tray and jig 102 and carried into the space 103 upon opening of the port 105 of the thermal processing furnace 101. The space 103 of the thermal processing furnace 101 which is sealed by closing the port 105 is then heated to about 50°–100° C. by the heating means 104 and the air is evacuated by the action of the vacuum pump 112.

Next, the high-temperature non-oxidizing gas for pre-heating is introduced under pressure from the high-temperature non-oxidizing gas-storage tank 108 via the pipe 124 and valve 116, and the waste batteries are further heated. During this pre-heating period, the heating gas in the space 103 is continually agitated by a fan 109, and by the heating process using the pre-heating gas, the group of waste batteries is heated uniformly in a short period of time at a temperature of about 100° C.–160° C. at which the metals are not oxidized.

The pre-heating by vacuum heating and under the pressure of the non-oxidizing gas for pre-heating is suspended upon a small amount of vaporization of the valuable component to be recovered from the waste batteries. When the temperature of the group of waste batteries reaches 200° C.–500° C., there occur melting, vaporization and carbonization of the organic components, such as paper and plastic, on the surface of the waste batteries, with partial vaporization of the low-boiling-point metals, and therefore the heating is suspended at the temperature of the previous step.

Upon completion of the pre-heating of the waste batteries, the valve 119 is closed, the valve 118 is opened to connect the vacuum pump 112 to the processing furnace space 103 via the heated pipe 122, and the pump is activated to eject the pre-heating gas in the furnace space from the gas ejection passage 125 after the few vaporized components have been collected at the condenser 106 and gas adsorber 107, upon which the space 103 becomes depressurized (about $5\times10^{-3}$ Torr).

Next, heating is continued and the temperature is fixed at about 250° C. Heating is continued at the same temperature and pressure and when suction resumes by the vacuum pump 112, the vaporization of the low-temperature-vaporizing components contained in a portion of the waste batteries, such as cadmium (Cd), becomes active, and Cd, etc. is recovered in the condenser.

When the generation of vaporization of the low-temperature-vaporizing components such as Cd has stopped, the temperature is further increased by the heating means, vaporization begins of components which vaporize at a moderate temperature of about 350° C. ($5\times10^{-3}$ Torr), for example zinc (Zn), and the Zn, etc. is recovered by the condenser 106.

When the vaporization of components such as Zn which vaporize at moderate temperature has stopped, the temperature of the group of waste batteries is further increased by heating, and when a temperature of about 680° C. ($5\times10^{-3}$ Torr) has been reached, vaporization begins of the components which vaporize in a relatively high temperature range, for example lead (Pb), and the Pb, etc. is recovered by the condenser.

The heating continues even when vaporization of the components such as Pb which vaporize in a relatively high temperature range has begun and after their recovery has been completed, and the temperature of the group of waste batteries is then increased to about 900° C. to recover manganese (Mn).

The temperature is further increased, and increasing the temperature to about 1150° C. allows the recovery of oxides such as ZnO, while further heating to above this temperature allows the recovery of copper (Cu) and tin (Sn). Also, by providing a plurality of separate recovery and condensing apparatuses, it is possible to raise the purity of each recovered component. Usually, upon completion of the recovery of the components vaporized at each temperature level, the components remaining in the waste batteries are stable oxides and carbon, and even if thrown away they do not constitute a source of environmental pollution.

The example described above serves to explain a method for separating and collecting each of the metal components in the waste batteries, by raising the temperature in the thermal processing furnace by stages while under a vacuum.

However, the main purpose of processing waste batteries is their conversion to non-harmful substances, and in cases where separate recovery is not necessarily required, even if valuable components are recovered during the processing, the temperature inside the processing furnace may be rapidly increased to 1000° C.–1150° C., or in some cases to about 1200° C. to complete vaporization of the metal and non-metal components in a short period of time.

In addition, in the method of separate recovery described above, if the object is recovering manganese oxide, ZnO or other stable compounds as simple metals, an additional amount of the metal components may be recovered by opening the valve 120 and blowing in reducing gas such as hydrogen from the reducing gas-feeding source 111 via the pipe 121 on the residue obtained after recovering the metal components in stages, for reduction treatment at a temperature of about 700° C.–1200° C., and then resuming suction with the vacuum pump. The reducing agent may also be coke or the like mixed with the waste batteries beforehand.

After the above-mentioned recovery of valuable components, the valve 119 is opened to blow in a non-oxidizing gas such as nitrogen from the non-oxidizing gas-feeding source 110 for cooling, after which the non-oxidizing gas which has been heated to a high temperature is fed to the pre-heating gas storage tank 108 while the cooled residue is taken out from the processing furnace 101.

The residue which is taken out contains no harmful components, and may be thrown away in that state.

EXAMPLE 3

Another example of the present invention will now be explained with reference to FIG. 1.

FIG. 1 is a schematic view of an apparatus capable of performing the method of the present invention in a continuous manner. Waste batteries 1 are processed using a plurality of hermetically connected processing chambers consisting of a pre-heating chamber 2 connected to a high-temperature non-oxidizing gas storage tank 7 with a pipe, a plurality of vacuum-heating vaporization chambers 3–5 which are serially connected to the pre-heating chamber in a hermetical manner and which are also hermetically connected to vacuum pumps 17–19 with pipes via condensers 10–12, gas adsorbing apparatuses 13–15 and valves 25–27, and a cooling chamber 6 connected to the vacuum-heating vaporization chambers and to a non-oxidizing gas-feeding source for cooling and a high-temperature non-oxidizing gas storage tank via pipes.

The waste batteries 1 are held in a tray, loaded onto a pressure pusher or motorized roller to be carried into the apparatus comprising the series of processing chambers beginning with the pre-heating chamber 2, and transported to each processing chamber in order and ejected outside the processing apparatus through the final cooling chamber 6.

The tray holding the waste batteries 1 is then carried into the pre-heating chamber 2, the entrance port is shut to seal the pre-heating chamber, and the vacuum pump 16 is activated to lower the pressure of and evacuate the pre-heating chamber 2 while it is heating, which creates a non-oxidizing condition around the waste batteries while they are pre-heated to a temperature of, for example, about 50° C.–100° C.

In cases where the amount of waste batteries being introduced is large making it difficult to uniformly preheat the entirety within a short time, the non-oxidizing gas for pre-heating is pressure-fed by a pump from the storage tank 7, the inside of the pre-heating chamber is pre-heated while under pressure from the non-oxidizing gas with agitation by an agitating fan, and upon completion of the pre-heating process the vacuum pump 16 is activated to eject the non-oxidizing gas from the pre-heating chamber to create a vacuum.

Next, the tray leaves through the exit port of the pre-heating chamber and enters into the first vacuum-heating processing chamber 3 which is hermetically connected to the pre-heating chamber and is already at a high temperature and vacuum state (250° C., $5\times10^{-3}$ Torr), the entrance port of the first vacuum-heating processing chamber is shut and heating is continued, and the vapor and gas produced in the first vacuum-heating processing chamber is suctioned out by the vacuum pump 17 through the condenser 10, gas adsorber 13 and valve 25. Normally, the pipe running from the first vacuum-heating processing chamber to the condenser is heated by the heater, as are the pipes running from the vacuum-heating processing chambers to the condensers thereafter.

Upon completion of the vapor generation in the first vacuum-heating processing chamber, the tray is sent to the second vacuum-heating processing chamber 4 which is hermetically connected to the first thermal processing chamber and is at a high temperature and vacuum state. The second vacuum-heating processing chamber is sealed shut and the waste batteries are heated to raise the temperature to a prescribed temperature, and then the valve 26 is opened, and the vapor and gas produced in the second vacuum-heating processing chamber are collected at the condenser 11 and the gas adsorber 14 by the action of the vacuum pump 18.

Upon completion of vapor generation at the second vacuum-heating processing chamber, the tray is sent to the third vacuum-heating processing chamber 5 which is hermetically connected to the second thermal processing chamber and is at a high temperature and vacuum state. The third vacuum-heating processing chamber is sealed shut, and when the waste material reaches a prescribed temperature by heating, the valve 27 is opened and the vapor and gas produced in the third vacuum-heating processing chamber are adsorbed and collected at the condenser 12 and the gas adsorber 15 by the action of the vacuum pump 19.

The collection of vaporized components in this third vacuum-heating processing chamber may, if necessary, be performed by additional vacuum heating after heating and reduction treatment with a reducing gas such as hydrogen, which is fed from the reducing gas source 9. As mentioned previously, when reduction treatment is employed, high-vaporization-temperature metal compounds such as oxides are reduced to simple low-vaporization-temperature metals and recovered as vapor.

The reduced material may also be combined with the next group of waste batteries fed to the pre-heating chamber for re-processing.

The tray leaving the third vacuum-heating processing chamber 5 is finally sent to the cooling chamber 6 which is hermetically connected to the processing chamber. The processed waste batteries sent to the cooling chamber are cooled by nitrogen gas, etc. from the non-oxidizing gas-feeding source 8 and ejected outside the apparatus, and then the inside of the chamber is evacuated with the pump 21. The ejected processed waste batteries contain no components which might constitute an environmental pollution source, and further they contain little or no valuable components which are worth recovering.

The heat from the non-oxidizing gas used for the cooling is fed to the storage tank 7 and stored to be used for pre-heating of the next batch of waste batteries carried to the apparatus.

In the case of this example as well, the metal and non-metal components vaporized and collected at each of the vacuum-heating processing chambers consist of the components which vaporize at the vacuum heat temperatures of each processing chamber. The temperature and degree of vacuum of each vacuum-heating processing chamber is determined as desired depending on the metal component to be recovered. Also, the number of processing chambers may also be increased if necessary, in which case the temperatures of the additional processing chambers may be appropriately set depending on the metal components to be separated and recovered.

In this example, the pre-heating temperature for the waste batteries was 50° C.–100° C. but in cases where the waste batteries include mercury cells and recovery of the mercury is an object, the pre-heating conditions are preferably about 30° C.–40° C. ($5\times10^{-3}$ Torr), and therefore the subsequent vaporization temperatures are preferably set slightly higher than the pre-heating conditions, to recover the mercury at the first stage.

In addition, between the pre-heating chamber and the first vacuum-heating processing chamber, and between each subsequent vacuum heating chamber, that is between the exit port of the preceding processing chamber and the entrance port of the following processing chamber, there are provided buffer chambers to absorb the temperature difference between the two chambers, and the vacuum sealed state is increased at the connections at the entrance and exit ports of each of the processing chambers. Recovery is also preferably made of the molten metal components from the waste batteries at the high temperatures in the buffer chambers.

EXAMPLE 4

A concrete example will now be given of a method for processing copper-containing waste material according to the present invention.

A group of waste materials including printed wiring boards recovered by dismounting of different types of electric and electronic devices are placed in the waste material holder of a two-level jig 102, and upon opening of the port 105 of the thermal processing furnace 101, they are carried into the space 103. Upon closing of the port 105, the space 103 in the sealed thermal processing furnace 101 is evacuated with the vacuum pump 112 and then heated by heating means 104. If the temperature-elevating rate of the waste material at this time is slow, the high-temperature non-oxidizing gas stored for pre-heating is introduced from the high-temperature non-oxidizing gas-storage tank 108 through the pipe 124 and the valve 116, and the valve 116 is closed for further heating of the waste material. During this pre-heating period, the heating gas in the space 103 is continually agitated by a fan 109 if necessary, to heat the group of waste materials uniformly in a short period of time at a temperature of about 100° C.–160° C. at which the metals are not oxidized.

The pre-heating by vacuum heating and under the pressure of the non-oxidizing gas for pre-heating is suspended upon a small amount of vaporization of the valuable component to be recovered from the waste material. When the temperature of the group of waste materials reaches 150° C.–250° C., there occur melting, vaporization and carbonization of the organic components, such as plastic in the insulation paint on the surface and between the layers of the waste material, with partial vaporization of the low-boiling-point metals, and therefore the heating is suspended at the temperature of the previous step.

At the latter stage of pre-heating of the waste material, the valve 118 is opened to connect the vacuum pump 112 to the processing furnace space 103 via the heated pipe 122, and the pump is activated to eject the pre-heating gas in the processing furnace space from the gas ejection passage 125 after the few vaporized components have been collected at the condenser 106 and gas adsorber 107, upon which the space 103 becomes depressurized (about $5\times10^{-3}$ Torr).

When the generation of vaporization of the low-temperature-vaporizing components such as plastic has stopped, the temperature is further increased by the heating means, vaporization begins of components which vaporize at a moderate temperature of about 350° C. (5×10$^{-3}$ Torr), for example zinc (Zn), and the Zn, etc. is recovered by the condenser 106.

When the vaporization of components such as Zn which vaporize at moderate temperature has stopped, the temperature of the group of waste materials is further increased by heating, and when a temperature of about 680° C. (5×10$^{-2}$–5×10$^{-3}$ Torr) has been reached, vaporization begins of the components which vaporize in a relatively high temperature range, for example lead (Pb), and the Pb, etc. is recovered by the condenser.

Heating is continued to exceed this temperature, and when the temperature reaches about 1200° C., copper (Cu) may be recovered. However, since raising the temperature of the furnace to such high temperature conditions drastically increases costs, according to the present invention the heating is suspended at a more economical 1100° C., and the copper is recovered in molten form.

As a result of thermal processing at 1100° C. as described above, for processing of waste material such as printed wiring boards whose main metal component is copper, usually a beady substance consisting substantially of copper and carbon is obtained in the catch pan. Also, a portion of the copper obtained is incorporated in caked carbon in the holder.

Next, the valve 118 is closed, and the valve 119 is opened to allow the pump 113 to feed the furnace with non-oxidizing gas for cooling from the non-oxidizing gas-feeding source 110 via the pipe 121, and when the produced lumpy substance is cooled, the high-temperature non-oxidizing gas resulting from heat exchange in the furnace is sent by the pump 114 through the bulb 115 to the storage tank 108 where it is stored as non-oxidizing pre-heating gas. Meanwhile, the port 105 is opened and the cooled and solidified globular substance in the catch pan and the caked carbon in the holder are taken out of the furnace. The beady substance which is taken out substantially consists of copper particles with carbon adhered to the surface thereof.

Next, the carbon/copper particles and caked carbon which are taken out are sent through a crushing step which is not shown, and the surface-adhering carbon is removed by crushing means such as a crusher which is also equipped with a stirring blade. During the crushing, an air flow is passed through the mill to eject the peeled carbon component out of the mill. Most of the attached carbon is removed by this mechanical crushing.

The copper particles from which the surface-adhering carbon has been removed still have a small amount of carbon penetrated into the interior of the surface sections. Thus, after the copper particles are obtained by the above-mentioned crushing step, they are sent through a polishing step which is also not shown, to remove the surface-penetrated carbon to further increase the purity of the copper particles. The polishing is performed by a dry method using fine alumina powder. The copper particles obtained by this polishing contain no carbon and are of extremely high purity.

The example described above involves a method for separating and recovering various metal components including copper which are contained in copper-containing waste material, by raising the temperature in stages in a simple vacuum-heating processing furnace.

EXAMPLE 5

Another example of the present invention will now be explained with reference to FIG. 1.

Waste material 1 is processor using a plurality of hermetically connected processing chambers consisting of a pre-heating chamber 2 which is connected with a pipe to the high-temperature non-oxidizing gas storage tank 7, a plurality of hermetically connected vacuum-heating vaporization chambers 3–5 which are also hermetically connected in a serial manner to the pre-heating chamber, and Connected with pipes to vacuum pumps 17–19 via condensers 10–12, gas adsorbers 13–15 and valves 25–27, and a cooling chamber 6 connected to the vacuum-heating vaporization chambers and to which are independently connected with pipes a cooling non-oxidizing gas-feeding source 8 and a high-temperature non-oxidizing gas-storage tank 7.

The waste material 1 is placed in the top holder of a two-level jig of which the bottom is a melt catch pan, which is set onto a pressure pusher or motorized roller to be carried into the apparatus comprising the series of processing chambers beginning with the pre-heating chamber 2 (or air-exchange chamber), and transported to each processing chamber in order and ejected outside the processing apparatus through the final cooling chamber 6.

The jig holding the waste material is then carried into the pre-heating chamber 2, the entrance port is shut to seal the pre-heating chamber, and the vacuum pump 16 is activated to lower the pressure of and evacuate the pre-heating chamber 2 while it is heating, which creates a non-oxidizing condition around the waste material while it is pre-heated to a temperature of, for example, about 50° C.–100° C.

In cases where the amount of waste material being introduced is large, making it difficult to uniformly preheat the entirety within a short time, the non-oxidizing gas for pre-heating is pressure-fed by a pump from the storage tank 7, the inside of the pre-heating chamber is pre-heated while under pressure from the non-oxidizing gas with agitation by an agitating fan, and upon completion of the pre-heating process the vacuum pump 16 is activated to eject the non-oxidizing gas from the pre-heating chamber to create a vacuum in the furnace.

Next, the jig leaves through the exit port of the pre-heating chamber and enters into the first vacuum-heating processing chamber 3 which is hermetically connected to the pre-heating chamber and is already at a high temperature and vacuum state (350° C., 5×10$^{-2}$–5×10$^{-3}$ Torr), the entrance port of the first vacuum-heating processing chamber is shut and heating is continued, and the vapor and gas produced in the first vacuum-heating processing chamber is suctioned out by the vacuum pump 17 through the condenser 10, gas adsorber 13 and valve 25. The pipe running from the first vacuum-heating processing chamber to the condenser is usually heated by the heater, as are the pipes running from the vacuum-heating processing chambers to the condensers thereafter.

Upon completion of the vapor generation in the first vacuum-heating processing chamber, the jig is sent to the second vacuum-heating processing chamber 4 which is hermetically connected to the first thermal processing chamber and is already at a high temperature and vacuum state. The second vacuum-heating processing chamber is sealed shut and the waste material is heated to raise the temperature to a prescribed temperature, during which time the valve 26 is opened and the vapor and gas produced in the second vacuum-heating processing chamber are collected in succession at the condenser 11 and the gas adsorber 14 by the action of the vacuum pump 18.

Upon completion of vapor generation at the second vacuum-heating processing chamber, the jig is sent to the third vacuum-heating processing chamber 5 which is hermetically connected to the second thermal processing chamber and is already at a high temperature and vacuum state. The third vacuum-heating processing chamber is sealed shut and the valve 27 is opened, and until the waste material reaches a prescribed temperature by heating, the vapor and gas produced in the third vacuum-heating processing chamber are adsorbed and collected at the condenser 12 and the gas adsorber 15 by the action of the vacuum pump 19.

The collection of vaporized components in this third vacuum-heating processing chamber may, if necessary, be performed by additional vacuum heating after heating and reduction treatment with a reducing gas such as hydrogen, which is fed from the reducing gas source 9. As mentioned previously, when reduction treatment is employed, metal compounds such as oxides are reduced to simple metals and collected as vapor.

The thermal processing in this third vacuum-heating processing chamber is the final thermal processing, and the temperature is set to 1100° C., which is slightly above the boiling point of copper, the main final object metal component to be recovered. At this temperature, copper is in a molten state and is recovered in drops in the catch pan of the jig as a beady substance whose surface sections are coated with carbon, and a portion remains in the form of liquid drops in the caked carbon formed in the holder as a result of carbonization of the plastic.

The jig which has collected beady molten copper in the catch pan at the third vacuum-heating processing chamber 5 and which has caked carbon in the holder then leaves the processing chamber 5 and is sent to the cooling chamber 6, where it is cooled by the non-oxidizing gas fed by the pump 22 from the cooling non-oxidizing gas storage tank 8 through the bulb 28, and solidified. The high-temperature non-oxidizing gas obtained by the cooling is sent from the valve 32 to the storage tank 7 where it is stored and later used for pre-heating of the next waste material. The solidified beads in the catch pan and the caked carbon in the holder after leaving the cooling chamber are then sent to a carbon film-crushing apparatus 33 for crushing. Also, the cooling chamber 6 from which the cooled solids have been ejected is then evacuated with the vacuum pump 21 and readied for processing of the next batch.

The crushing apparatus 33 is one capable of crushing and peeling off the carbon adhering on the surface of the copper grains, and it is constructed with a stirring blade-equipped crusher. Here, the adhering carbon covering the surface of the beady molten copper is peeled off by mechanical impact, and is carried outside the mill through the air duct 36 by the air flow fed into the apparatus to be recovered in the recovery apparatus 35.

The granular solidified copper which leaves the crusher 33 is then sent to the polishing apparatus 34. Here, the granular copper solid is agitated with a sludge of fine alumina powder, by which the surface of the copper solid is abraded to remove the carbon penetrating into the surface sections. The polishing material is not limited to alumina powder, as $SiO_2$ particles or the like which are often used for polishing may be employed; however, alumina powder is most suitable for the copper grains of the present invention.

In the example described above as well, the metals and non-metals vaporized and collected at each of the vacuum-heating processing chambers are those components which vaporize at the vacuum heat temperatures of each processing chamber. The degree of temperature and pressure in each of the vacuum-heating processing chambers is set as desired depending on the type of metal component to be recovered. The number of processing chambers may also be increased or decreased if necessary. In cases where the waste material to be processed consists only of copper-containing printed wiring boards as mentioned above, the number of thermal processing chambers may be reduced to two since there are fewer types of metal components to recover.

Furthermore, in the case of the example described above, between the pre-heating chamber and the first vacuum-heating processing chamber, and between each subsequent vacuum heating chamber, that is between the exit port of the preceding processing chamber and the entrance port of the following processing chamber, there are provided buffer chambers to absorb the temperature difference and pressure difference between the two chambers, for an increased vacuum sealed state at the connections at the entrance and exit ports of each of the processing chambers.

We claim:

1. A method for processing metal-containing waste material that also contains a non-metal component, characterized by crushing the metal-containing waste material, recovering metal-containing particles of a size in the range that will pass a 50 mesh screen and of increasing sizes to particles that will pass through a one mesh aperture screen from the crushed waste material by separation, introducing said recovered metal-containing particles into a vacuum-heating furnace, preheating the furnace while evacuating air from the furnace by suction, raising the temperature level of the furnace in stages to a first temperature to volatilize non-metal containing waste material, and then to at least one higher temperature to volatilize at least one metal component from the metal-containing waste material while continuing the vacuum suction to remove the volatilized non-metal and metal vapors, recovering the metal and non-metal vapors produced at said first and said at least one higher temperature level, passing the metal vapor through a condenser to convert the metal vapor to liquid metal and passing the non-metal vapor through an adsorber, and recovering the liquid metal.

2. The method for processing metal-containing waste material according to claim 1, characterized in that said metal-containing particles are within a particle size range that will pass a 50 mesh screen and of increasing sizes to particles that will pass through a one mesh aperture screen, and are supplied to the vacuum heating furnace in separate charges, each separate charge consisting of a main particle size and a mixture of particles within ±50% of the size of the main particle size, but excluding particles larger than those passing a one mesh aperture screen and particles smaller than particles passing a 50 mesh screen.

3. The method for processing metal-containing waste material according to claim 1 or claim 2, characterized in that said processing comprises introducing said recovered metal-containing particles into a combined pre-heating chamber and gas exchange chamber, passing the pre-heated metal-containing particles serially through a plurality of hermetically connected vacuum vaporization chambers, raising the temperature of the metal-containing particles to a higher predetermined level in each successive chamber by the controlled heating of said chambers, each of said chambers, passing said stream of vapors through a metal vapor condenser and non-metal vapor adsorber, collecting the output of the metal vapor condenser in the form of molten metal.

4. The method for processing metal-containing waste material according to claims 1 or 2, characterized in that said metal-containing waste material consists of empty cans fabricated from different metals.

5. A method for processing metal-containing waste material that includes a non-metal component to recover metal and non-metal components, characterized by introducing the metal-containing waste material into a sealed heating furnace, pre-heating the metal-containing waste material while evacuating the furnace by suction, and further heating while continuing the vacuum suction to raise the temperature level of the metal-containing waste material uniformly and in stages to a highest temperature level, at which highest temperature level a residue of the metal-containing waste material remains in the furnace, vacuum suctioning the vapor produced in the furnace at each temperature level, collecting and condensing the vapor of the metal components in a condenser and collecting the vapor of the non-metal components in an adsorber and, after completing the collection of the vaporized metal and non-metal components at the highest temperature level, feeding a cooling non-oxidizing gas to the furnace to cool the residue of the processed metal-containing waste material remaining in the furnace.

6. The processing method according to claim 5, wherein said metal-containing waste material consists of waste batteries.

7. The method for processing waste batteries according to claim 6, characterized by preheating said waste batteries to a first temperature that is less than the temperature at which oxidation products are produced, feeding a non-oxidizing gas into said heating furnace and rapidly and uniformly heating the waste batteries to a second higher temperature while agitating the waste batteries, and then removing said gas by suction to complete the pre-heating.

8. The method for processing waste batteries according to claim 6 or 7, characterized in that upon completion of vapor generation at the highest temperature level, a residue of the waste batteries remains in the furnace that contains unvolatilized metal and a reducing gas is introduced into the furnace to reduce the residue of the waste batteries, and thereafter heating of the reduced residue and vacuum suction are resumed to produce metal vapors, and said metal vapors are condensed and recovered and a final waste residue is left in the furnace.

9. The method for processing waste batteries according to claim 8, characterized in that after recovery of the vaporized metal components and non-metal components, a cooling non-oxidizing gas stream is fed to the furnace to cool the non-final waste residue of the processed waste batteries, and the non-oxidizing gas stream is subsequently used to pre-heat additional waste batteries in the process.

10. A method for processing waste batteries according to claims 6 or 7, characterized in that the processing of the waste batteries is performed using a single heating furnace that is connected with a vacuum pump for drawing out metal vapor and non-metal vapor from the furnace, furnace heating means, evacuation means, non-oxidizing gas-storage means, high-temperature non-oxidizing gas storage means, metal vapor-condensing means and non-metal vapor-adsorbing means.

11. A method for processing waste batteries according to claims 6 or 7, characterized in that the waste batteries are thermally processed by being consecutively passed through a plurality of hermetically connected processing chambers, which chambers comprise a pre-heating chamber connected to a vacuum pump and a high-temperature non-oxidizing gas storage tank, and a plurality of hermetically connected vacuum vaporization chambers which are hermetically and serially connected to said pre-heating chamber and to each other, and each vacuum vaporization chamber is connected to a vacuum pump via a condenser and a gas adsorber in that order, wherein the temperatures of the chambers increase by stages to higher temperatures from the vacuum vaporization chamber connected to the pre-heating chamber, and where the last of said vacuum vaporization chambers is connected to a reducing gas-feeding apparatus, and said last vacuum vaporization chamber is hermetically connected to a cooling chamber, said cooling chamber being connected to a cooling non-oxidizing gas-feeding apparatus and a high-temperature non-oxidizing gas storage tank.

12. A method for processing metal-containing waste material to recover an object metal where said waste material can comprise carbon, said method, characterized by loading a metal-containing waste material onto a two-level jig, said jig comprising a melt catch pan section and a waste material holder section, and introducing said metal-containing waste material containing jig into a sealed heating furnace, pre-heating the metal-containing waste material while evacuating the furnace by suction, further heating while continuing the vacuum suction to raise the temperature level of said metal-containing waste material in stages to vaporize components of the metal-containing waste material, recovering the vapor produced at each temperature level by condensation and adsorption means, raising the temperature of the waste material at a final stage to above the melting point of the object metal to convert said object metal to molten metal in liquid drop form and, thereafter cooling to solidify said molten metal to form grains, removing any carbon components formed during the vaporization steps that adhere to the metal grains and recovering the metal grains.

13. The processing method according to claim 12 wherein the object metal in the metal-containing waste material is copper.

14. A method for processing copper-containing waste material according to claim 13, characterized in that the thermal processing of the copper-containing waste material by converting said copper to molten copper in liquid drop form and cooling and solidifying it to obtain copper grains is performed in a single thermal processing furnace having a single vacuum heating chamber, said furnace provided with a vacuum pump for drawing out metal vapor and non-metal vapor from the furnace, non-oxidizing gas-feeding means, high-temperature non-oxidizing gas-storing means, produced metal vapor-condensing means and non-metal component vapor-adsorbing means.

15. The method for processing copper-containing waste material according to claim 13, characterized in that the thermal processing of the copper-containing waste material by converting said copper to molten copper in liquid drop form and cooling and solidifying it to form copper grains is performed by subjecting the copper-containing waste material to a series of thermal processing steps comprising pre-heating the copper-containing waste material in a pre-heating chamber under vacuum while contacting the copper-containing waste material with a high-temperature non-oxidizing gas, heating the copper-containing waste material under vacuum in a first vacuum vaporization chamber that is hermetically connected to said pre-heating chamber and to a plurality of hermetically connected vacuum vaporization chambers which are hermetically and serially connected to each other, heating the copper-containing waste material in one or more of the plurality of vacuum heating chambers to increase the temperature of the copper-containing waste material in stages, raising the temperature of the copper-containing waste material in the last of said plurality of vacuum vaporization chambers to a temperature above the melting temperature of the copper component, collecting the molten copper component, transferring the molten copper-component and any remaining waste material to a cooling chamber that is hermetically connected to the last vacuum vaporization chamber, and introducing a cooling non-oxidizing gas into said cooling chamber.

16. The method for processing copper-containing waste material according to any of claims 13 to 15, characterized in that the process includes removing any adhered carbon components from said cooled and solidified copper grains by mechanically crushing the solidified copper grains to remove said any adhered carbon and subsequently polishing the surface of the copper grains.

17. The method for processing copper-containing waste material according to claim 16, characterized in that said polishing step employs alumina powder as a polishing material.

18. The method for processing copper-containing waste material according to any of claims 13, 14 or 15, characterized in that said copper-containing waste material is crushed, and the crushed material is separated to recover particles of a size that will pass through a one mesh aperture screen.

19. The method for processing copper-containing waste material according to claim 18, characterized in that after said copper-containing waste material has been crushed, the recovered particles passing the one mesh screen are further separated with a sieve having a finer mesh into particles of a main particle size and a mixture of particles having a particle size within the range of ±50% of the main particle size, but excluding particles larger than those passing a one mesh aperture screen.

20. The method of claim 3 where the residue of metal-containing waste in the last of the vacuum vaporization chambers is contacted with a non-oxidizing cooling gas to reduce the temperature of said residue.

21. The process of claim 20 where the non-oxidizing cooling gas contacts the residue in the cooling chamber and thereafter passes into a high-temperature non-oxidizing gas storage apparatus.

* * * * *

UNITED STATES PATENT AND TRADEMARK OFFICE
CERTIFICATE OF CORRECTION

PATENT NO. : 5,735,933
DATED : April 7, 1998
INVENTOR(S) : Yoshiaki Yokoyama & Teruhisa Ogihara It is certified that error appears in the above-indentified patent and that said Letters Patent is hereby corrected as shown below:

In claim 3, line 59, after "chambers," insert --removing volatilized non-metal and metal vapors from--

Signed and Sealed this

Sixteenth Day of June, 1998

*Attest:*

BRUCE LEHMAN

*Attesting Officer*  *Commissioner of Patents and Trademarks*